United States Patent
Bryans et al.

(10) Patent No.: US 10,791,153 B2
(45) Date of Patent: Sep. 29, 2020

(54) CONFERENCE ROOM AUDIO SETUP

(71) Applicant: Bose Corporation, Framingham, MA (US)

(72) Inventors: Darryl John Bryans, Natick, MA (US); Trevor Donarski, Framingham, MA (US); Daniel T. Lynch, Winter Haven, FL (US)

(73) Assignee: Bose Corporation, Framingham, MA (US)

( * ) Notice: Subject to any disclaimer, the term of this patent is extended or adjusted under 35 U.S.C. 154(b) by 252 days.

(21) Appl. No.: 15/887,443

(22) Filed: Feb. 2, 2018

(65) Prior Publication Data

US 2018/0219922 A1     Aug. 2, 2018

Related U.S. Application Data

(60) Provisional application No. 62/453,815, filed on Feb. 2, 2017.

(51) Int. Cl.
| | |
|---|---|
| *H04M 3/56* | (2006.01) |
| *H04L 29/06* | (2006.01) |
| *G06F 3/16* | (2006.01) |
| *H04M 9/08* | (2006.01) |
| *H04S 7/00* | (2006.01) |

(52) U.S. Cl.
CPC .......... *H04L 65/1069* (2013.01); *G06F 3/162* (2013.01); *H04L 65/403* (2013.01); *H04M 3/568* (2013.01); *H04M 9/082* (2013.01); *H04S 7/30* (2013.01)

(58) Field of Classification Search
CPC ... G06F 3/162; H04L 65/1069; H04L 65/403; H04M 3/568; H04M 3/56; H04M 9/082; H04S 7/30; H04S 7/302; H04S 3/02; G10L 19/008; H04H 20/48; H05B 37/0245
See application file for complete search history.

(56) References Cited

U.S. PATENT DOCUMENTS

| | | | |
|---|---|---|---|
| 8,527,878 B2 | 9/2013 | Drewes et al. | |
| 2005/0275626 A1* | 12/2005 | Mueller | H05B 37/0245 345/156 |
| 2007/0263877 A1* | 11/2007 | Beard | H04H 20/48 381/20 |
| 2009/0144063 A1* | 6/2009 | Beack | G10L 19/008 704/500 |
| 2011/0320942 A1* | 12/2011 | Drewes | H04M 3/56 715/705 |
| 2016/0134989 A1* | 5/2016 | Herre | H04S 3/02 381/20 |
| 2017/0223477 A1* | 8/2017 | Chon | H04S 3/008 |

* cited by examiner

*Primary Examiner* — Le H Luu
(74) *Attorney, Agent, or Firm* — Brian M. Dingman; Dingman IP Law, PC

(57) ABSTRACT

A method for establishing the routing of audio signals between a plurality of audio inputs and a plurality of audio outputs in a conferencing system. The method includes establishing a matrix comprising at least one available cross-point, where each cross-point defines a particular mapping of an audio input to an audio output, receiving user input that results in the selection of one or more available cross-points, and based on the selection of one or more available cross-points, automatically establishing in a programmable processor the mapping of audio inputs to audio outputs defined by the selected cross-points.

18 Claims, 9 Drawing Sheets

Speaker Matrix

| In: | Out: Mic Zone 1 | Mic Zone 2 | Front |
|---|---|---|---|
| Mic 1 (Pre-AEC) 1 | 0.0 | 0.0 | 0.0 |
| Mic 2 (Pre-AEC) 2 | 0.0 | 0.0 | 0.0 |
| Mic 3 (Pre-AEC) 3 | 0.0 | 0.0 | 0.0 |
| Mic 4 (Pre-AEC) 4 | 0.0 | 0.0 | 0.0 |
| Mic 5 (Pre-AEC) 5 | 0.0 | 0.0 | 0.0 |
| Mic 6 (Pre-AEC) 6 | 0.0 | 0.0 | 0.0 |
| Program 7 | 0.0 | 0.0 | 0.0 |
| Far-End 8 | 0.0 | 0.0 | 0.0 |

FIG. 4B

CONFERENCE ROOM AUDIO SETUP

CROSS-REFERENCE TO RELATED APPLICATION

This application claims priority of Provisional application 62/453,815 filed on Feb. 2, 2017, the disclosure of which is incorporated by reference herein in its entirety.

BACKGROUND

This disclosure relates to setting up audio for conference rooms.

Conference rooms, and combined conference room setups, can have many audio input devices such as microphones, telephones, headsets, and computers. The outputs typically can include a number of loudspeaker zones, computers, telephones, and headsets. Additionally, the need for acoustic echo cancelling (AEC) in conferencing applications, adds additional 'internal' audio signals such as AEC reference signals. The routing of all the audio signals between the inputs and outputs is critical to achieving quality sound, including no echo, both in the near end and the far end of a conferencing system. Establishing proper routing of the various audio signals is time-consuming, error-prone, and requires extensive experience and expertise. If the audio for multiple conference rooms is combined to form a larger conference room, which is a common scenario, the combination of the audio systems can present exponentially more such problems.

SUMMARY

All examples and features mentioned below can be combined in any technically possible way.

In one aspect, a method for establishing the routing of audio signals between a plurality of audio inputs and a plurality of audio outputs in a conferencing system includes establishing a matrix comprising at least one available cross-point, where each cross-point defines a particular mapping of an audio input to an audio output, receiving user input that results in the selection of one or more available cross-points, and based on the selection of one or more available cross-points, automatically establishing in a programmable processor the mapping of audio inputs to audio outputs defined by the selected cross-points.

Embodiments may include one of the following features, or any combination thereof. The method may further comprise establishing a programming object that comprises audio inputs and audio outputs, where the programming object implements the matrix. The conferencing system may comprise a plurality of microphones that each comprise an input, at least one codec signal input, and a mixed microphone input, and the outputs may comprise at least one codec, and at least one output zone, where each output zone comprises at least one loudspeaker. The matrix may comprise a plurality of available cross-points. The matrix may represent at least one possible cross-point that is disabled and not available to be used in the matrix, where the disabled cross-points, if used, would negatively impact conferencing audio quality.

Embodiments may include one of the following features, or any combination thereof. The matrix may represent at least one possible cross-point that is engaged and not available to be used in the matrix, where the engaged cross-points, if not used, would negatively impact conferencing audio quality. The method may further comprise receiving user input that results in the routing of at least one of microphone and non-microphone audio inputs to at least one loudspeaker. The method may further comprise displaying the matrix comprising at least one available cross-point. The cross-points may define only mappings that result in quality conferencing system audio.

Embodiments may include one of the following features, or any combination thereof. The available cross-points may represent only a portion of all possible mappings of each of the conferencing system audio inputs to each of the possible conferencing system audio outputs. The method may further comprise providing a user interface (UI) that comprises a control panel that presents the available cross-points, and a plurality of audio faders. The UI may not present any possible mappings that do not comprise available cross-points. The conferencing system may comprise local microphones and local loudspeakers, and the available cross-points may define only mappings of local microphone audio inputs to local loudspeaker audio outputs and that result in quality conferencing system audio.

Embodiments may include one of the following features, or any combination thereof. The conferencing system may comprise a combination of at least two previously-established conferencing setups, where each such conferencing setup comprises a mapping of audio inputs to audio outputs. The method may further comprise providing a UI that allows a user to group two or more previously-established conferencing setups into a combined conferencing setup. The UI may comprise a room combine inputs and outputs object, and an audio route object for each previously-established conferencing setup that is in the combined conferencing setup. The method may further comprise providing a UI that comprises a control panel that comprises an interface that allows the user to select the previously-established conferencing setups to be combined. The control panel may further comprise a plurality of audio faders. The method may further comprise routing rules for the grouped setups that result in quality conferencing system audio operated as a group, or as individual setups. The method may further comprise a method for automatically creating logical audio links between the two or more previously-established conferencing setups.

In another aspect, a method for establishing the routing of audio signals between a plurality of audio inputs and a plurality of audio outputs in a conferencing system, includes establishing a matrix comprising at least one available cross-point, where each available cross-point defines a particular mapping of an audio input to an audio output, wherein the cross-points define only mappings that result in quality conferencing system audio, and automatically establishing in a programmable processor the mapping of audio inputs to audio outputs defined by selected available cross-points.

In another aspect, a method for establishing the routing of audio signals between a plurality of audio inputs and a plurality of audio outputs in a conferencing system includes establishing a programming object that comprises audio inputs and audio outputs, where the programming object implements a matrix that comprises a plurality of available cross-points, where each available cross-point defines a particular mapping of an audio input to an audio output, and wherein the available cross-points define only mappings that result in quality conferencing system audio and represent only a portion of all possible mappings of each of the conferencing system audio inputs to each of the possible conferencing system audio outputs. A user interface (UI) that comprises a control panel that presents the matrix and a plurality of audio faders is provided. The UI does not present any possible mappings that do not comprise available cross-points. The UI does not present any faders that do not comprise available audio channels. Input that results in the selection of one or more available cross-points is received via the UI. Based on the selection of one or more available cross-points, the mapping of audio inputs to audio outputs defined by the selected cross-points is automatically established in a programmable processor.

Embodiments may include one of the following features, or any combination thereof. The conferencing system may comprise a combination of at least two previously-established conferencing setups, where each such conferencing setup comprises a mapping of audio inputs to audio outputs, and the method may further comprise providing a UI that comprises a control panel that comprises an interface that allows the user to select the previously-established conferencing setups to be combined.

In another aspect, a method for establishing the routing of audio signals between a plurality of audio inputs and a plurality of audio outputs in a conferencing system includes providing a user interface (UI) that presents representations of audio routing schemes for a plurality of separate audio conferencing setups, receiving, via the UI, input indicative of two or more of the separate audio conferencing setups that are selected to be combined into a single new separate audio conferencing setup, and establishing, in a programmable processor and based on the selected separate audio conferencing setups, a mapping of audio inputs to audio outputs for the single new separate audio conferencing setup.

BRIEF DESCRIPTION OF THE DRAWINGS

FIG. 4B illustrates a user interface (UI) display for a speaker matrix within a conference room audio setup router.

DETAILED DESCRIPTION

Figure 1:
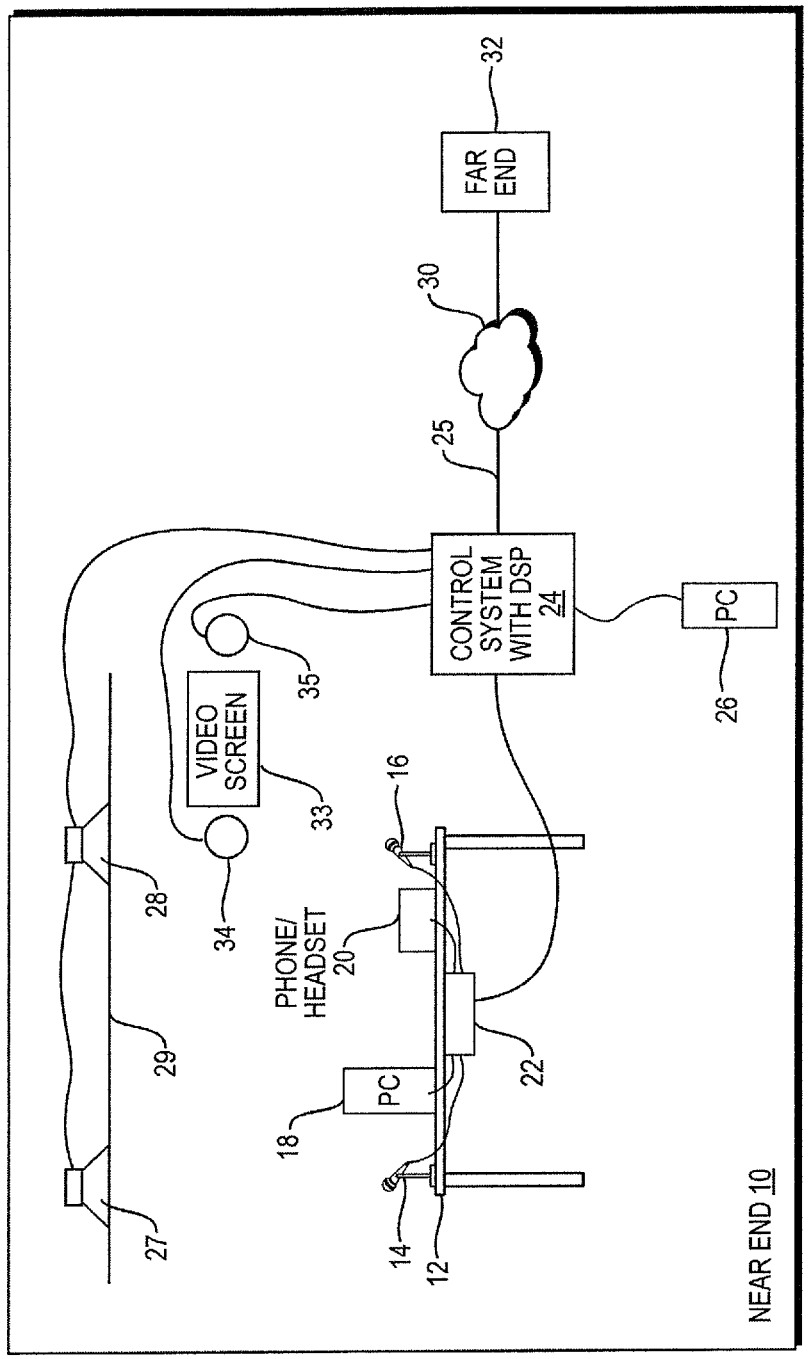
FIG. 1 is schematic diagram of an end-to-end conference system with detail of one conference room.

The conference room audio routing and combining accomplished by the present disclosure greatly simplifies the task of properly routing and controlling audio from inputs to outputs in a single conferencing setup, and also when two or more conference rooms are combined.

Elements of figures are shown and described as discrete elements in a block diagram. These may be implemented as one or more of analog circuitry or digital circuitry. Alternatively, or additionally, they may be implemented with one or more microprocessors executing software instructions. The software instructions can include digital signal processing instructions. Operations may be performed by analog circuitry or by a microprocessor executing software that performs the equivalent of the analog operation. Signal lines may be implemented as discrete analog or digital signal lines, as a discrete digital signal line with appropriate signal processing that is able to process separate signals, and/or as elements of a wireless communication system.

When processes are represented or implied in the block diagram, the steps may be performed by one element or a plurality of elements. The steps may be performed together, or at different times. The elements that perform the activities may be physically the same or proximate one another, or may be physically separate. One element may perform the actions of more than one block. Audio signals may be encoded or not, and may be transmitted in either digital or analog form. Conventional audio signal processing equipment and operations are in some cases omitted from the drawing.

FIG. 1 is a schematic diagram of a conference room 10, which will be useful to develop an understanding of the conference room audio routing and conference room audio combining of this disclosure. Conference room 10 includes conference table 12. An audio network interface device 22 is optionally located close to or on or under table 12, and is configured to receive audio signals from audio input devices that are used in the conference room. Such audio input devices can include some or all of: one or more microphones (such as table-top microphones 14 and 16), one or more telephones and/or telephone headsets 20, and one or more computers 18. Device 22 interfaces to the audio devices, and digitizes and packetizes the audio signals to/from the audio devices. The digitized packetized audio signals are then sent via a network (such as an Ethernet network) to/from audio control system 24. Alternatively, microphones 14, 16 may be connected directly to control system 24 by analog or digital connections.

Control system 24 typically has a digital signal processor (DSP), or another type of programmable processor. The DSP is programmed during the audio system commissioning process, to accomplish a desired routing of audio inputs to audio outputs, and to provide acoustic echo cancelling. Some details of DSP programming that are well known in the art will not be further described herein. Audio outputs can include but are not limited to some or all of: one or more ceiling loudspeakers (27, 28, mounted at ceiling 29, and which may comprise one or more output zones), two program loudspeakers (34, 35, mounted to the left and right of video screen 33 so as to accomplish stereo sound), one or more codec far-end audio connections 25 (e.g. plain old telephone service (POTS), public switched telephone network (PSTN), or voice over Internet protocol (VoIP)), and one or more computers (e.g., PC 26). Audio input and output devices and conference room and conference center setups are well known in the field and so will not be further described herein. In some cases, the conferencing setup also includes a "far end" 32, which is a distant conference room, whether down the hall, across town, or across the country or the world. When there is a far end, room 10 is considered the near end. The two ends are typically connected by a network, such as the internet 30.

Figure 2:
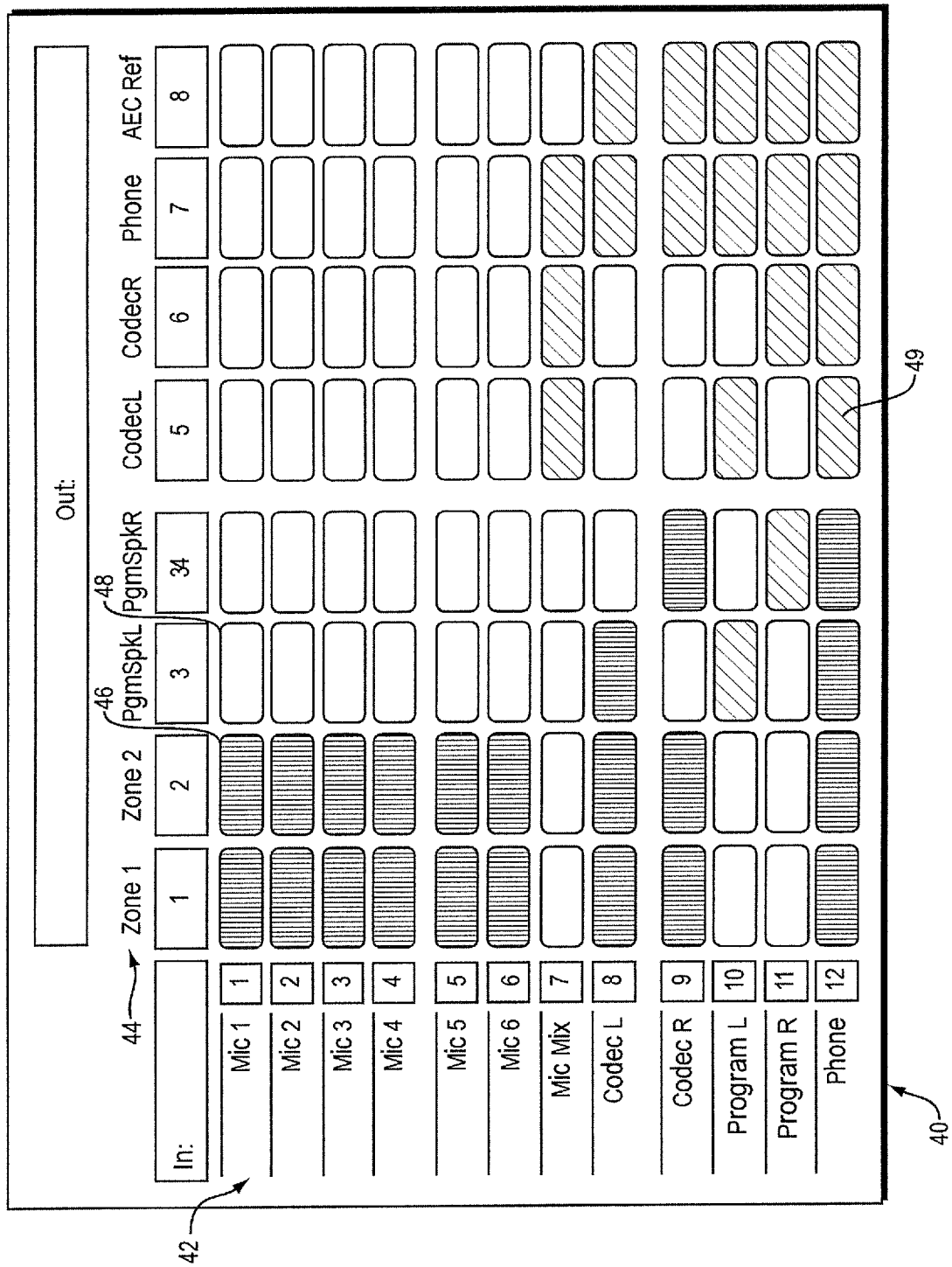
FIG. 2 illustrates an exemplary matrix of cross-points in a mapping of inputs to outputs, in an audio system for a conference room.

The present disclosure relates to manners of routing audio inputs to audio outputs in a conferencing setup of one or more rooms. The present disclosure also relates to combining the audio routing of two or more existing conferencing setups. Routing is often accomplished by an expert who is able to manually design the routing inside of a single matrix that resides in the DSP, where the matrix includes every possible cross-point (i.e., every possible routing of an input to an output). An exemplary 12×8 matrix 40 (representing twelve inputs that can be mapped to eight outputs), which comprises 96 cross-points, is shown in FIG. 2. Routing involves selecting the zero, one, or more outputs of row 44 for each input of column 42. For example, the input "mic 1" (microphone 1) can be routed to any or all of the outputs 44 (zone 1, zone 2, pgmSpkL, pgmSpkR, codecL, codecR, phone, and AEC reference). An output "zone" can be a room location with one or more loudspeakers (e.g., the ceiling area directly over a conference room seating location that has a microphone). PgmSpk L and R are audio signals, typically stereo, for playback beside a video device 33, such as a monitor. Codec L and R are audio signals to a specific codec, e.g. a video codec. A phone line is a second type of codec, e.g. a PSTN or VoIP connection. The Program L and Program R inputs are audio from a computer (e.g., from a YouTube video). AEC reference is an audio signal created internal to the DSP (not connected physically to the DSP like microphones and loudspeakers) used to provide an acoustic echo cancelling (AEC) function that is available in most conferencing setups.

FIG. 2 is annotated regarding a particular aspect of the present disclosure. Some of the cross-points are darkened, such as cross-point 48 (which maps the "Mic1" input to the "program speaker L" output). This darkening symbol is used in this illustration for cross-points which should never be used in a conferencing setup, as they would lead to audio problems such a loss of audio, distortion, echo, duplication, and feedback. For example, cross-point 48, if enabled would cause feedback since this would connect the mic 1 input to the loudspeaker for the mic 1 position. These darkened cross-points are considered "forbidden" in the present disclosure, and they are not offered as routing choices to the person doing the setup, except in an advanced mode. Some impacts of such forbidden routing that is indicated at the darkened cross-points are set forth in Table 1.

Some of the other cross-points of matrix 40 are labelled with angled hatching, such as cross-point 49 (which maps the "Phone" input to the "Codec L" output). The cross-points with angled cross-hatching are "required" cross-points, which must always be used in the present audio setup. Required cross-points represent routing that needs to be present in order to accomplish correct and good quality conferencing audio. Required cross-points are those that are necessary for correct and good audio, and forbidden cross-points are those that should never be used for correct and good sound. In this context, 'correct' means: necessary audio sources are heard or are available at all necessary and appropriate outputs and only those outputs. In this context, 'good sound' or 'good audio' means free from (or at least a reduced contribution from) echo, distortion, inappropriate attenuation or gain, feedback, or other such condition other than optimal. The required and forbidden cross-points are determined in advance, and programmed in the system.

The remainder of all possible cross-points are labelled with vertical cross-hatching, such as cross-point 46 (which maps the "mic1" input to the "zone2" output). These cross-points are considered to be "allowable" or acceptable, i.e., the routings are useful and applicable in a conferencing setup in that they may improve conference room audio performance or required for proper and correct sound at the appropriate and applicable outputs or required for optimal sound, but they are not necessarily mandatory. In the present methods, the only routing choices that are presented to the user are these "allowable" cross-points; the rest of the cross-points are never allowed or are always required, and the DSP is automatically programmed as such. Accordingly, the user is not presented with an option to select any of the forbidden or required cross-points. To facilitate troubleshooting, an "advanced" mode can be made available, where the user can see all the automatically programmed crosspoints and change them for the purpose of troubleshooting.

In a typical prior-art use situation, during set-up of a conferencing system, an expert audio technician or engineer programs the DSP using a matrix that represents routing of each input to all outputs, such as that shown in FIG. 2 (but without the annotations). It should be understood that the matrix for any given setup will be unique, dictated by the input sources and the outputs that are available in the room. Also, the matrix in this prior-art situation is typically represented by a single programming object that includes all the inputs and all the outputs, similar to programming object 40. A problem with this prior-art programming approach is that in many cases many or most of the cross-points, if used, will cause problems with the audio, leading to sub-optimal audio performance. In the example of FIG. 2, about 65% of the cross-points should not be used in order to maintain quality audio. The use of a single large matrix thus simplifies the programming task, but increases the complexities of the considerations that need to be taken into account by the set-up personnel. Errors during installation and commissioning can lead to severely degraded system performance and greatly increase commissioning and troubleshooting time. An experienced engineer will know which cross-points should be used and which should not. However, using an experienced engineer to program audio routing is expensive, and time consuming. And, if the audio setup changes, e.g., a microphone needs to be added, the routing needs to be changed by the experienced engineer, who may not even be available at the time. Even experienced engineers, when presented with a large matrix of buttons representing each possible input to output routing (as in matrix 40), can easily and inadvertently click on an adjacent button without realizing the error.

The routing methodology of the present disclosure involves automatically pre-establishing a routing matrix in which unnecessary cross-points are removed and cross-points which must be set to a known state to guarantee proper audio are set to the appropriate state and protected from use by the person commissioning the audio routing in the conferencing setup. Accordingly, problematic routing, known to cause degraded audio at either the far or near end, is eliminated when the matrix is used during audio setup. Additionally, some routing is always required for a proper functioning audio conference session. Failure to complete these routing assignments also leads to degraded audio, typically at the far end. The cross-points that are used in such required routing are automatically set to the proper state for programming by the DSP, and removed from use by the person doing the commissioning (except in an advanced mode).

Figure 3:
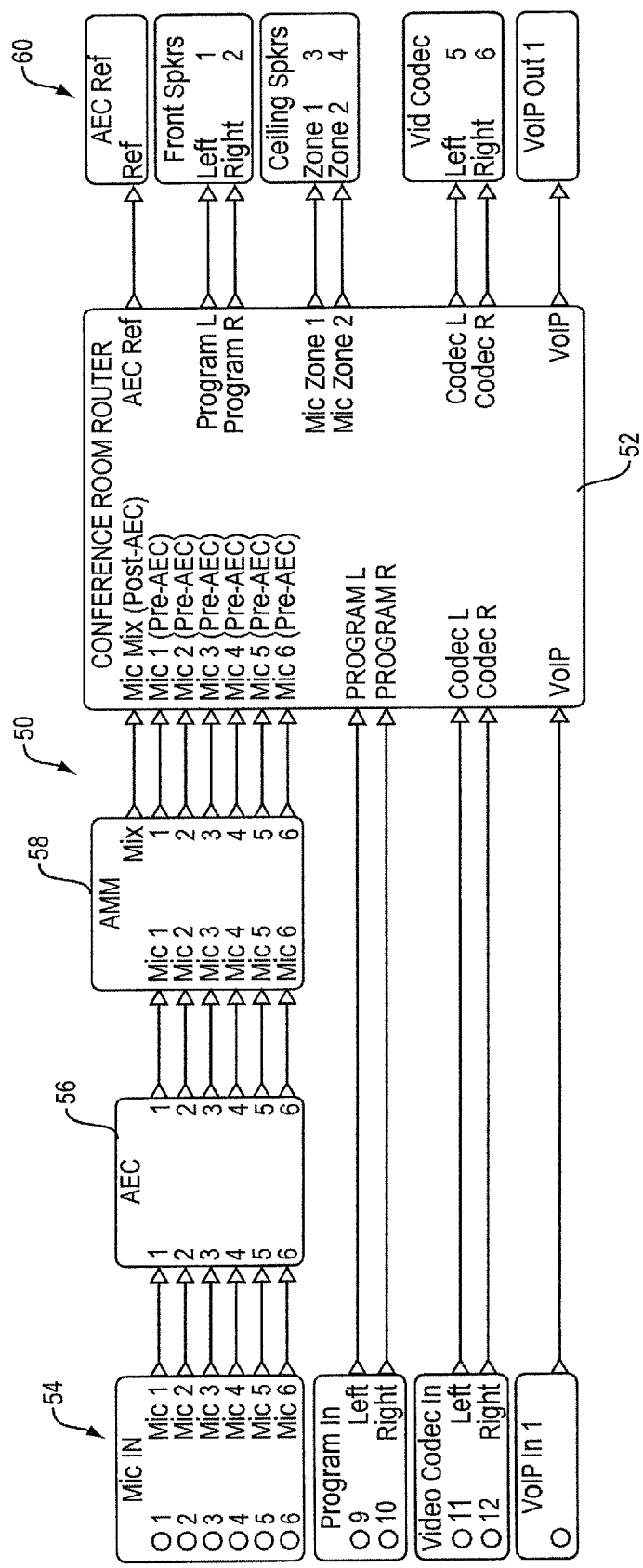
FIG. 3 is a completed audio routing diagram for an exemplary conference room.

FIG. 3 is a completed audio routing diagram 50 for an exemplary conference room, illustrating an audio routing scheme that is a result of an audio programming completed using the methodologies of the present disclosure. The external inputs are in column 54. Microphone inputs (1-6) are routed to an acoustic echo cancelling (AEC) object 56, and then to an automatic microphone mixer (AMM) object 58, whose outputs also include a mic mixed output. The outputs are provided to the conference room router object 52, the outputs of which are the audio system outputs set out in column 60 and the AEC reference signal which is invisibly (automatically) connected to an input on the AEC object. Object 52 implements the matrix of available and required input to output cross-points, as described above. Once programming is completed, the DSP then automatically implements the programmed audio routing, in the same manner that the DSP is programmed in prior-art cases where all of the input to output mapping selections are accomplished manually.

Figure 4A:
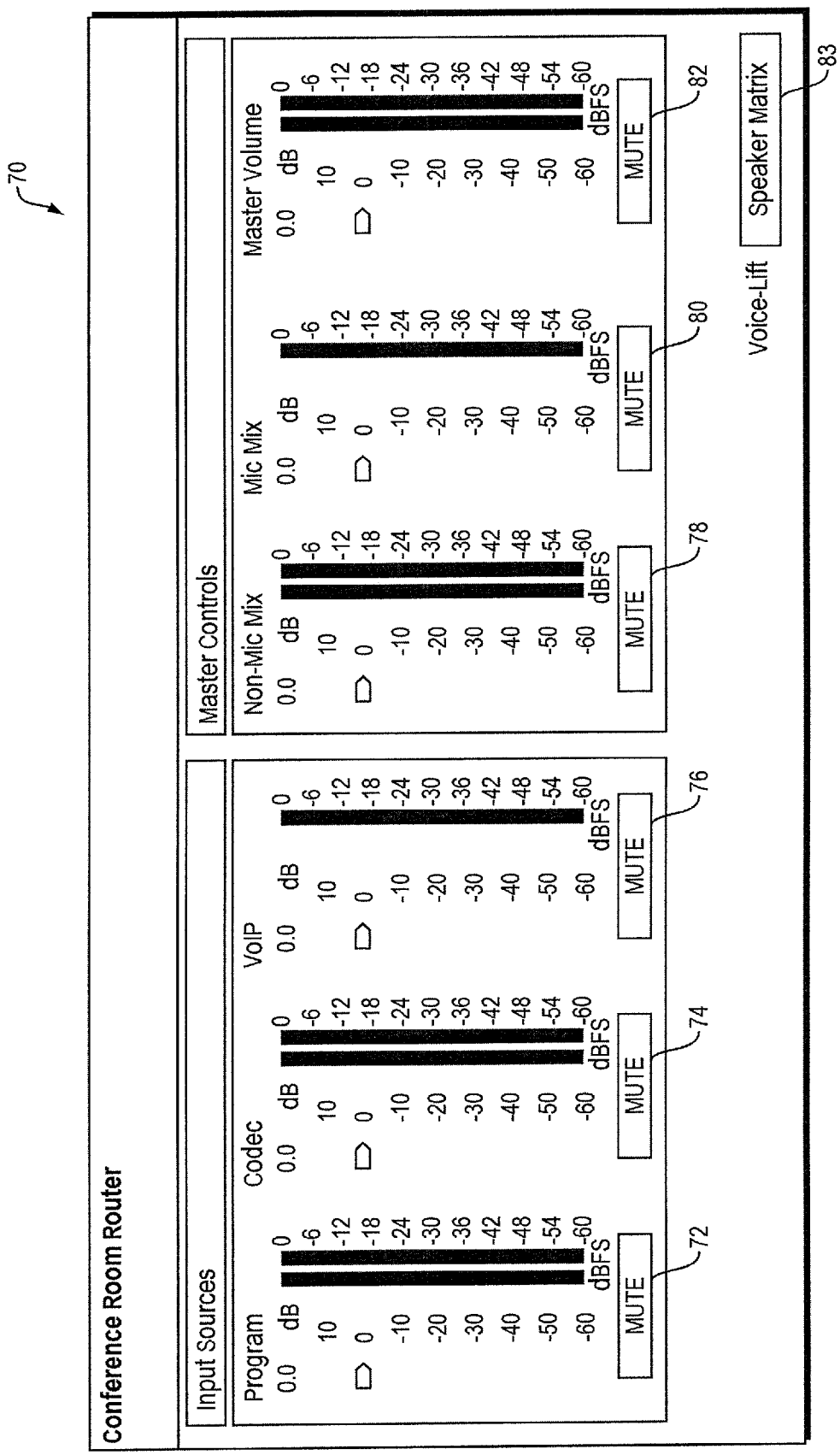
FIG. 4A illustrates a user interface (UI) display for a control panel for a conference room audio setup router.

The audio routing methodologies described herein can also contemplate establishing a user interface (UI) with a display, for a control panel for the conference room router. The UI establishes a means to allow the user to manually select at least the routing of microphone inputs and non-microphone inputs, to output loudspeaker(s). A non-limiting example of such a UI display 70 is shown in FIG. 4A. Faders 72, 74, 76, 78, 80, and 82, allow the user to set a gain for the program in, codec in, VoIP in, program (non-mic) mix, mic mix, and master volume, respectively. Each fader is used to establish a single gain value for all of the one or more inputs or outputs in each of these categories. It should be noted that the UI is automatically dynamically created based on the number of inputs. If, for example, Program audio was not required, fader 72 would not be present and the Input sources would only include Codec 74 and VoIP 76. Matrix 84, FIG. 4B, becomes visible when the Speaker Matrix button 83 in FIG. 4A is pressed. Matrix 84 is the means by which the allowed cross-points are presented to the user, for selection by the user.

In one non-limiting example, after the above-described 'Always' and 'Never' rules are applied to all possible matrix selections that would degrade audio by selection or omission of selection, these selections are removed from the matrix. The remaining 'user selectable' matrix crosspoints remain; an example is matrix 84. These are the routing or selections for which a rule cannot be consistently applied. That is, they relate to specifics of each installation—e.g., where microphones are placed relative to speakers and where seats in the room are located relative to speaker and microphone zones—that cannot be anticipated by an Always or Never type rule. The matrix with only the user-selectable crosspoints 84, is displayed when button 83, FIG. 4A, is pressed.

Selection matrix 84 is the means, in this non-limiting example, that allows the user to select the allowed routing of audio inputs (microphone inputs and non-microphone inputs), to audio outputs (loudspeaker(s)). Inputs (there are 8 inputs in this non-limiting example) are set out in column 102, and the (3, in this case) output loudspeakers are set out in row 104. Selection is made by the user clicking on a box at an intersection of a row and a column, such as box 105. The selections made via matrix 84 are automatically programmed into the DSP in control system 24, FIG. 1 (just as they would be if there was no limited selection matrix but rather the full input-to-output mapping matrix, an example of which is illustrated in FIG. 2), and results in routing of the selected inputs to the selected outputs.

Selection matrix 84 further includes a means that allows the user to select mix-minus routing of the microphones (set out in column 102) to the mix-minus outputs Mic Zone 1 and Mic Zone 2, set out in row 104. A mix-minus output, as is known in the art, is used to prevent a microphone input from being outputted by a loudspeaker which is at or near the location of the microphone, in order to allow the acoustic echo canceller functionality of the audio system to be effective while not deleting the microphone input from the signal sent to the other outputs (both in the near end and the far end). Mix minus zones also prevent audio feedback as a microphone is less likely to receive its own signal (a cause of audio feedback) if the microphone does not transmit audio, through the use of a mix-minus configuration, to a loudspeaker that could acoustically couple to the same microphone.

Table 1 illustrates a set of audio routing "rules" implemented by an exemplary router. These rules, or heuristics, are used to establish the required, forbidden, and allowed cross-points of the matrix of cross-points that is used in the subject audio routing methodologies. The rules are in the first column, the inputs are in the second column, the outputs are in the third column, and impacts of incorrect routing are in the last column. It should be noted that the rules in Table 1 are exemplary and in no way limiting of the disclosure, serving only to illustrate one manner in which the required, forbidden and allowed cross-points in an audio routing matrix such as shown in FIG. 2, can be developed.

TABLE 1

| Rule | Input | Output | Impact of incorrect routing |
|---|---|---|---|
| Always receive | Far end inputs | Local Speaker Outputs | No far end audio |
| Never receive | Local post-AEC mic mix | | feedback loop |
| | Local pre-AEC mic mix | | echo |
| | Room Combine Post-AEC Mic Input | | Delay |
| Optionally receive (user controlled) | Individual local Pre-AEC mic inputs (user controlled) | | |
| | Local Program input (user controlled) | | |
| Optionally receive (rule based) | Room Combine Pre-AEC Mic Input (Overhead output only) | | |
| | Room Combine NonMics Input if Far End is received | | |
| Always receive | Local Program input | AEC Reference | echo |
| | Far End inputs | | echo |
| | Room Combine NonMics Input | | echo |
| Optional | Room Combine Pre-AEC Mic input | | |
| Never receive | Local Pre-AEC mic inputs | | Distortion |
| | Local Post-AEC mic inputs | | Distortion |
| Always receive | Local Post-AEC mic inputs | Far End Output | loss of audio |
| | Local Program input | | loss of audio |
| | Other Far End inputs | | loss of audio |
| | Room Combine Post-AEC Mic Input | | loss of audio |
| | Room Combine NonMics Input | | loss of audio |

TABLE 1-continued

| Rule | Input | Output | Impact of incorrect routing |
|---|---|---|---|
| Never receive | Local Pre-AEC mic inputs | | echo |
| | Self Far End input | | echo |
| | Room Combine Pre-AEC Mic Input | | echo |
| Always receive | Local Post-AEC mic inputs | Aux Output | loss of audio |
| | Local Program inputs | | loss of audio |
| | Far End inputs | | loss of audio |
| | Room Combine Post-AEC Mic Input | | loss of audio |
| | Room Combine NonMics Input | | loss of audio |
| Optional | Local Pre-AEC mic inputs | | |
| | Room Combine Pre-AEC Mic Input | | |
| Always receive | Local Post-AEC mic inputs | Room Combine Mic Output | loss of audio |
| Never receive | Local Pre AEC mic inputs | | echo |
| | Local Program input | | duplicate routing |
| | Far End inputs | | duplicate routing |
| | Room Combine Post-AEC Mic Input | | duplicate routing |
| | Room Combine NonMics Input | | duplicate routing |
| | Room Combine Pre-AEC Mic Input | | |
| Always receive | Local Program input | Room Combine NonMics Output | loss of audio |
| | Far End inputs | | loss of audio |
| Never receive | Local Pre-AEC mic inputs | | echo/duplicate routing |
| | Local Post-AEC mic inputs | | duplicate routing |
| | Room Combine Post-AEC Mic Input | | feedback loop |
| | Room Combine NonMics Input | | feedback loop |
| | Room Combine Pre-AEC Mic Input | | |

As described above, the rules for required cross-points (labelled in Table 1 as "always receive") are automatically implemented in the DSP programming in order to accomplish all of the required routing; these cross-points are not presented to the user as choices, and so they cannot be disabled. Also, the rules for forbidden cross-points (labelled in Table 1 as "never receive") are automatically implemented in the DSP programming in order to prevent forbidden routing from being implemented (or presented to the user for selection and then implementation); these cross-points are not presented to the user as choices, and so they cannot be enabled. In one example, only the "optionally receive" or "optional" rules are presented to the user and so available to be implemented by user choice. One non-limiting way to present the choices to the user is via matrix 84, although the choices could be presented in other ways such as by a list from which available cross-points can be selected by the user.

As further explanation for the information conveyed in Table 1, the entries in two rows are further explained. In the row with the "AEC Reference" output: the role of the AEC is to remove far end speech from returning to the far end. As such, it uses an "AEC reference" signal to understand what signal is originating in the far end. This is needed so that the AEC can remove all the far end signal from the microphone in the near end such that when transmitted to the far end, only the near end speech is included (despite the fact that the near end microphones pick up both the near end speech (direct from talker to mic) and the far end speech (indirectly from the loudspeakers in the room)). The rules for the AEC reference output dictate what should and what should not be, and what is optional, in the AEC reference. This is important in order to remove from the combined signal picked up at the microphone, only those signals that should not be sent to the far end (especially far end speech and local audio that will be sent directly, e.g. program audio), and to ensure the signal to be sent to the far end includes everything that should be sent (specifically, local audio such as speech). Program audio is played into the near end and thus will be picked up by the microphones. This signal should be removed because the microphone is not the primary method for transmitting this signal to the far end. Rather, the program audio is mixed electronically with the far end signal in the DSP. Since this signal needs to be removed from the microphone pickup, it is included in the AEC reference. Far end inputs go to the reference, so they will be removed so as not to send back to the far end which would be perceived as echo. Room combine audio comes for other local rooms. This signal, like program audio, will be sent directly, not indirectly through the microphones. Hence it should go into the reference for removal from the signal that the mics pick up.

A second example is illustrated in the row with "Far End Output" as the output. The signal to the far end should be the speech from the near end (after any inadvertent or far end audio has been removed) plus any additional audio sources such as near end program audio. Local microphones should be mixed at the near end so that an auto-mixer can optimize signal to noise ratio—turn down or 'gate' mics where a person is not talking or turn up or ungate mics where someone is talking. As such, an auto-mix output of the local post-AEC signal is always sent to the far end but the local pre-AEC signals should never be sent. The signal from the far end should never be transmitted back to the far end, as that would cause echo.

Another manner of establishing the "optional" crosspoints is to allow the user to set them in advance. In this case, the input to output routing scheme, and the DSP programming to accomplish the scheme, can be fully automated. Another approach is to allow both pre-setting of optional crosspoints and a selection matrix such as matrix 84. Since forbidden input to output routings are not able to be selected by the user in any of these methodologies, they all prevent the user from inadvertently selecting crosspoints that would adversely affect the audio.

This disclosure also includes aspects of automatically combining audio routing that has previously been established for two or more separate conferencing setups. Such a conferencing setup might include a room, a setup with a near end and a far end, or any other physical configuration. Any combination of conferencing setups can greatly magnify the potential audio problems due to the fact that there will be more inputs, more outputs, and more potential routing errors that would negatively impact audio performance. As with the audio routing described above, during a combining operation some of the possible cross-points of audio routing in the combined room/conferencing setup are disabled, such that they may not be selected by the person who is commissioning the audio routing.

Room combining in rooms with teleconferencing or video conferencing capabilities is made more difficult by the fact that each room usually has multiple outputs and AECs. Each output in a teleconferencing room has unique audio routing requirements. When a second room is combined with the first, the audio routing requirements become even more complex. This complexity can lead to incorrect AEC references, which can cause echoes, far-side participants unable to hear each other, far-side participants unable to hear program sources, and microphone feedback, for example.

The subject audio routing combining methodologies address all of the audio routing requirements for teleconference or video conference room combining without requiring logic programming, presets, or custom control programming. When the audio routing in teleconference or video conference rooms that have previously been properly setup, such as by using the cross-point presentation and selection methods described above, are combined, the audio that needs to be delivered to other rooms can be simplified to five audio streams: microphones, pre-AEC microphones, non-mic signals (left), non-mic signals (right) and 'Chain' (for chaining automatic mic mixers).

Figure 5A:
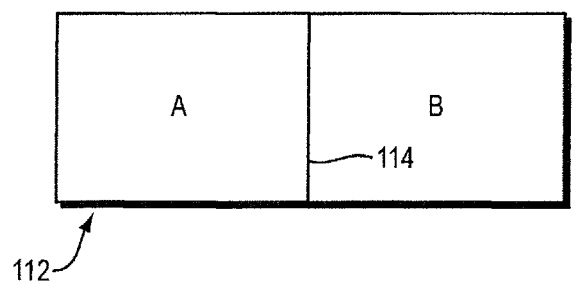
FIG. 5A illustrates a floor-plan view for multiple conference rooms.
Figure 5B:
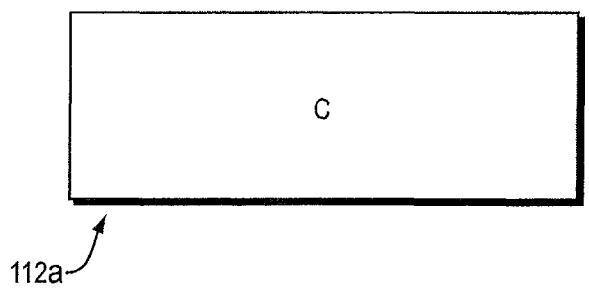
FIG. 5B illustrates a combined conference room.

To illustrate these points, imagine conferencing center 112 comprising two adjacent rooms, A and B, FIG. 5A. When they are combined into conferencing center 112a that comprises a combined room C, FIG. 5B (e.g., a moveable separating wall 114 is removed), various audio signals must now be shared between the rooms, for example, microphones. Microphones in Room A are for picking up speech of talkers in room A. Often, people in Room B may not be able hear all talkers in Room A despite the fact they are now in the same 'near end room', e.g., due to the size of the (combined) room C. For this reason, microphone audio from Room A should be sent to Room B loudspeakers so listeners in Room B can hear all talkers in Room A. Similarly, in reverse. Also, non-mic audio, such as program audio and codec inputs that are available in room A must be transmitted to and played back through room B speakers so that all listeners in the combined room hear Room A non-mic audio. Similarly, for Room B non-mic audio to Room A. Also, when the audio is stereo, four streams are required: Room A, L and R, to Room B; Room B, L and R, to Room A.

Figure 6:
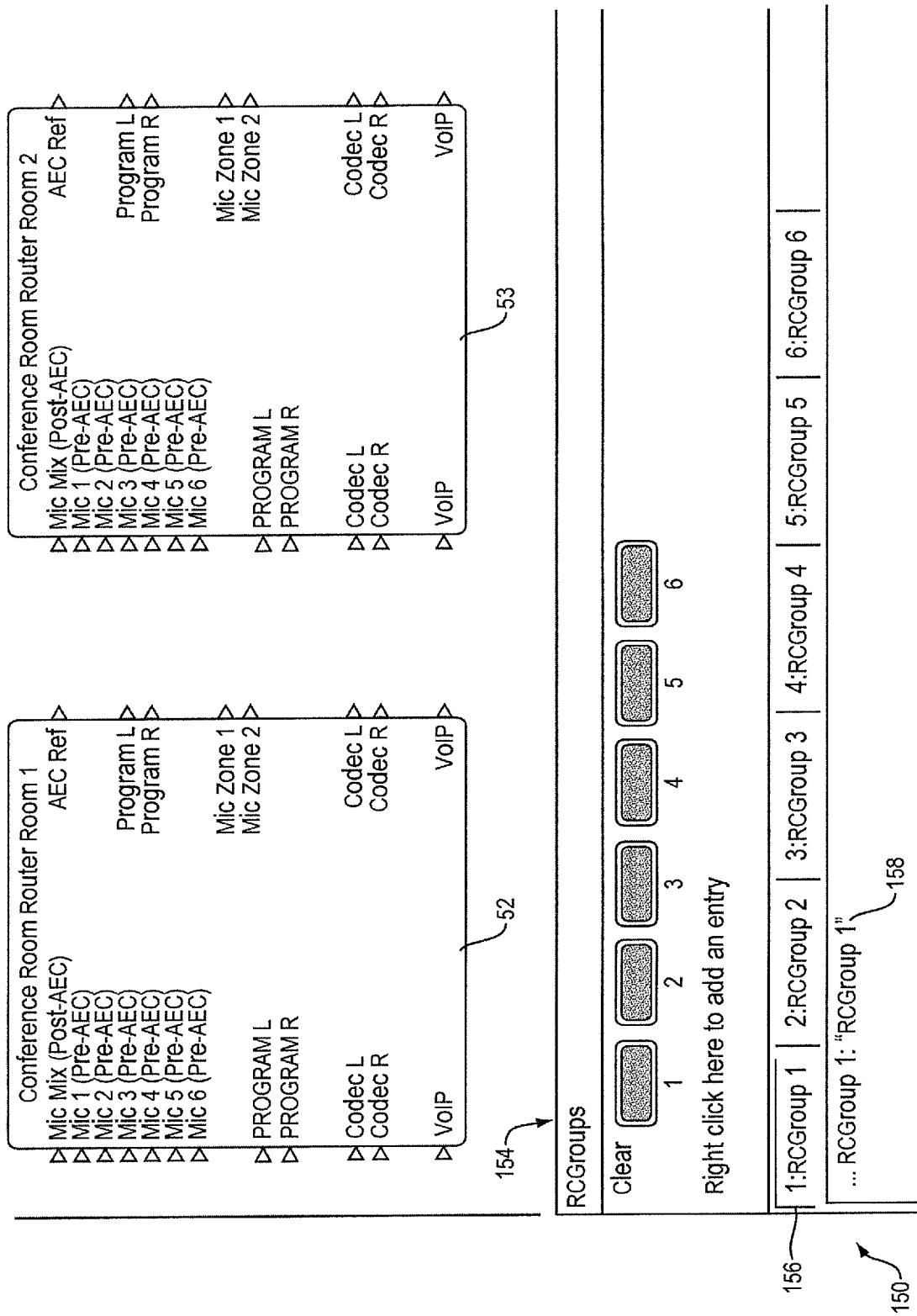
FIG. 6 illustrates a user interface that facilitates creating a combined group of conference rooms.

FIG. 6 illustrates a UI 150 that facilitates combining audio routing for multiple conference rooms that have already been properly setup, for example as described above. A first step in combining conference room routers is to create a group that includes the conference room routers for each of the conference rooms being combined. In this non-limiting example, grouping area 154 defines a number of possible groups. In this case, 'Group 1' 156 is selected, which opens group 1 grouping panel 158. The user can then drag the conference room routing programming objects for the rooms to be combined (e.g., object 52 for a first room and object 53 for a second room), into panel 158. Other known UI-related means of allowing a user to select objects can be used rather than dragging and dropping.

Figure 7:
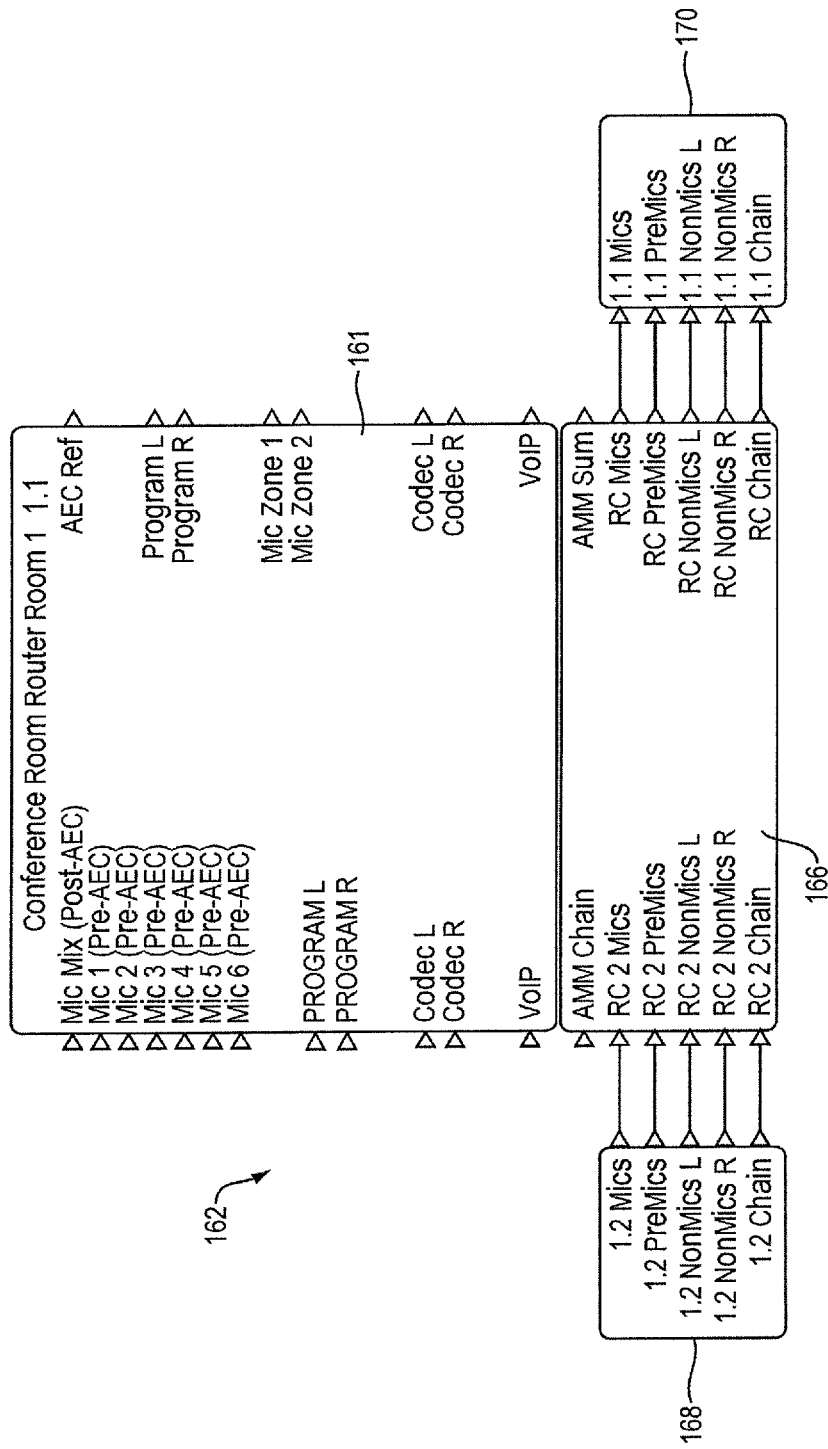
FIG. 7 illustrates a combined programming object and appended room audio routing objects.

After being added to a group, a conference room router object 161, FIG. 7, has a room combine inputs and outputs object 166 appended to or otherwise associated with it, as shown in FIG. 7, which illustrates a combined programming object and appended room audio routing objects, identified as object 162. Also, audio route objects 168 and 170 are added, so as to automatically route audio to/from other router objects in the same group. Each object 166, 168, and 170, will indicate in some manner which room combine group it is in, as well as which room it is within that group. In this example, "1.1" indicates group 1, room 1. The room combine inputs are labeled "1.2" to indicate that those are the inputs for the routing object from group 1, room 2, and "1.1" to indicate that those are the inputs for the routing object from group 1, room 1. When additional routing objects are added to a room combine group, each object in the group is automatically expanded with the inputs required for those additional rooms. Audio route objects (such as objects 168 and 170) are automatically added to route audio between the routing objects. As rooms are combined or divided, the subject methodology automatically routes audio as needed from the appropriate rooms to each output.

Figure 8:
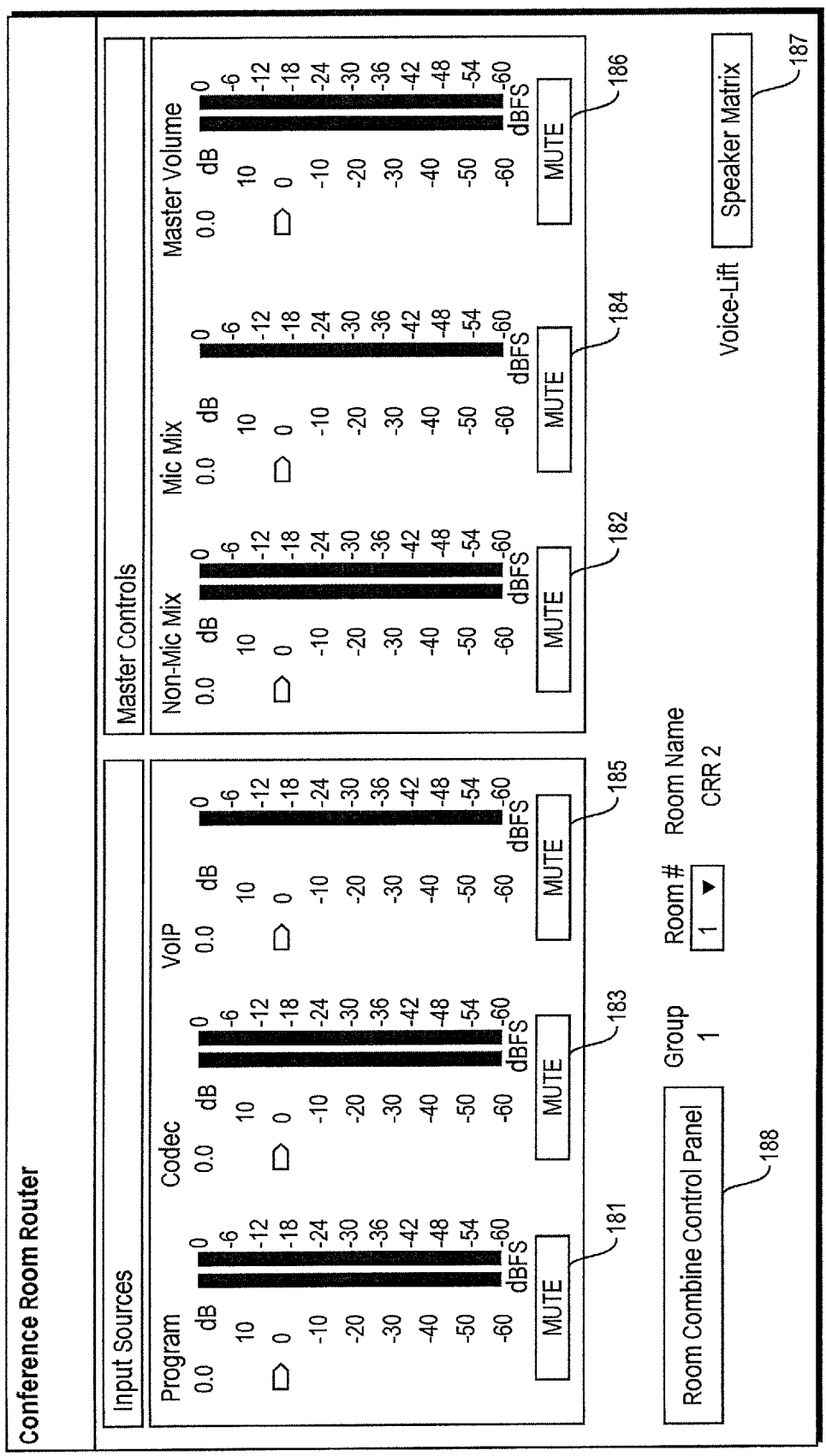
FIG. 8 illustrates a UI display for a combined control panel for a conference room combiner.

Routing audio between rooms is only one step needed to accomplish true conference room combining. When two or more rooms are functioning as a single room, the controls for the combined rooms also need to function as one. FIG. 8 illustrates an exemplary UI display 180 for a control panel for a conference room combiner. There are faders and mutes for the input sources (program audio 181, codec 183, and VoIP 185. When routing objects are combined using a combine group, the faders and mutes for the non-mic mix 182, mic mix 184, and master volume 186, simultaneously control all of the combined rooms. This eliminates the need to change programming of a remote control, wall controls, or third-party control systems, when rooms are combined. Room combine control panel button 188 when clicked will display a UI, such as that shown in FIG. 6, that facilitates combining audio routing for multiple conference rooms.

For example, when Room 1 is independent, the volume for Room 1 is controlled by the Master Volume fader on Conference Room Router 1. Changes made to this volume by a remote-control device, a wall control, or a third-party control system, will only affect Room 1. When Room 1 is combined with Room 2 and Room 3, the volume for all three rooms is controlled by the Master Volume fader on any of the three Conference Room Routers. Changes made to Room 1 volume by a remote, a wall control, or a third-party control system, will affect Room 1 and all other rooms currently combined with Room 1. The combined rooms automatically function as a single room, with no need for programming changes.

When multiple rooms that have previously been setup correctly (as described elsewhere herein) are then combined into a single "room" or conference center, the necessary input-to-output audio routing is typically accomplished automatically via the DSP. However, the user may need to or desire to change this routing scheme. When manual modifications are desired, the speaker matrix button 187 is clicked in order to display a UI with the matrix of allowed input to output routings in the combined room, such as the matrix shown in FIG. 4B. Routing can then be selected in the manner described above for conference room setup. The process can also operate in reverse. That is, combined rooms can be automatically de-combined by the user selection of the room(s) to be removed from the combination.

The room combining/de-combining aspects of this disclosure have at least the following benefits. They can automatically accomplish mapping/routing of audio when rooms are combined (or uncombined). They provide a UI for combined and uncombined modes. They ensure audio is routed by rules to prevent echo, etc., without user needing to make selections. They automatically provide virtual audio wires between the rooms (so user does not have to do this tedious, error-prone task).

Embodiments of the systems and methods described above comprise computer components and computer-implemented steps that will be apparent to those skilled in the art. For example, it should be understood by one of skill in the art that the computer-implemented steps may be stored as computer-executable instructions on a computer-readable medium such as, for example, floppy disks, hard disks, optical disks, Flash ROMS, nonvolatile ROM, and RAM. Furthermore, it should be understood by one of skill in the art that the computer-executable instructions may be executed on a variety of processors such as, for example, microprocessors, digital signal processors, gate arrays, etc. For ease of exposition, not every step or element of the systems and methods described above is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the disclosure.

A number of implementations have been described. Nevertheless, it will be understood that additional modifications may be made without departing from the scope of the inventive concepts described herein, and, accordingly, other embodiments are within the scope of the following claims.

What is claimed is:

1. A method for establishing the routing of audio signals between a plurality of audio inputs and a plurality of audio outputs in a conferencing system, comprising:
    establishing a matrix of a plurality of cross-points comprising at least one available cross-point, where each available cross-point defines a particular mapping of an audio input to an audio output that, if used, would not negatively impact the audio quality of the conferencing system;
    providing a user interface (UI) comprising a control panel that presents the at least one available cross-point as available for selection by a user;
    receiving, via the UI, user input that results in the selection of the at least one available cross-point; and
    based on the selection of the at least one available cross-point, automatically establishing in a programmable processor the mapping of audio inputs to audio outputs defined by the selected at least one available cross-point.

2. The method of claim 1, further comprising establishing a programming object that comprises audio inputs and audio outputs, where the programming object implements the matrix.

3. The method of claim 1, where the conferencing system comprises audio inputs that comprise: at least one codec and at least a microphone mix, and where the outputs comprise: at least one codec and at least one output zone, where each output zone comprises at least one loudspeaker.

4. The method of claim 1, wherein the matrix comprises a plurality of available cross-points.

5. The method of claim 1, further comprising receiving user input that results in the routing of at least one of microphone and non-microphone audio inputs to at least one loudspeaker.

6. The method of claim 1, further comprising displaying the matrix comprising at least one available cross-point.

7. The method of claim 1, wherein the available cross-points represent only a portion of all possible mappings of each of the conferencing system audio inputs to each of the possible conferencing system audio outputs.

8. The method of claim 7, further comprising providing a user interface (UI) that comprises a control panel that presents the available cross-points, and a plurality of audio faders.

9. The method of claim 8, wherein the UI does not present any possible mappings that do not comprise available cross-points.

10. The method of claim 1, wherein the conferencing system comprises local microphones and local loudspeakers, and wherein available cross-points define only mappings of local microphone audio inputs to local loudspeaker audio outputs.

11. The method of claim 1, wherein the UI is further configured to allow a user to group two or more previously-established conferencing setups into a combined conferencing setup.

12. The method of claim 11, wherein the UI comprises a room combine inputs and outputs object, and an audio route object for each previously-established conferencing setup that is in the combined conferencing setup.

13. The method of claim 11, wherein the UI that further comprises a second control panel that allows the user to select the previously-established conferencing setups to be combined.

14. The method of claim 13, wherein the control panel further comprises a plurality of audio faders.

15. A method for establishing the routing of audio signals between a plurality of audio inputs and a plurality of audio outputs in a conferencing system, comprising:
    establishing a programming object that comprises audio inputs and audio outputs, where the programming object implements a matrix that comprises a plurality of available cross-points, where each available cross-point defines a particular mapping of an audio input to an audio output, and wherein the available cross-points represent only a portion of all possible mappings of each of the conferencing system audio inputs to each of the possible conferencing system audio outputs;
    providing a user interface (UI) that comprises a control panel that presents the matrix and a plurality of audio faders, wherein the UI does not present any possible mappings that do not comprise available cross-points;
    receiving via the UI input that results in the selection of one or more of the plurality of available cross-points; and
    based on the selection of the one or more of the plurality of available cross-points, automatically establishing in a programmable processor the mapping of audio inputs to audio outputs defined by the selected cross-points.

16. The method of claim 15, wherein the conferencing system comprises a combination of at least two previously-established conferencing setups, where each such conferencing setup comprises a mapping of audio inputs to audio outputs, and further comprising providing a UI that comprises a control panel that comprises an interface that allows the user to select the previously-established conferencing setups to be combined.

17. A method for establishing the routing of audio signals between a plurality of audio inputs and a plurality of audio outputs in a conferencing system, comprising:
    providing a user interface (UI) that presents representations of audio routing schemes for a plurality of separate audio conferencing setups;

receiving, via the UI, input indicative of two or more of the separate audio conferencing setups that are selected to be combined into a single new separate audio conferencing setup; and establishing, in a programmable processor and based on the selected separate audio conferencing setups, a mapping of audio inputs to audio outputs for the single new separate audio conferencing setup.

18. A method for establishing the routing of audio signals between a plurality of audio inputs and a plurality of audio outputs in a conferencing system, comprising:

establishing a matrix comprising at least one available cross-point, where each available cross-point defines a particular mapping of an audio input to an audio output;

providing a user interface (UI) comprising a control panel that presents the at least one available cross-point as available for selection by a user;

receiving, via the UI, user input that results in the selection of the at least one available cross-point; and based on the selection of the at least one available cross-point, automatically establishing in a programmable processor the mapping of audio inputs to audio outputs defined by the selected at least one available cross-point.

* * * * *